(12) United States Patent
Liu et al.

(10) Patent No.: US 8,874,326 B2
(45) Date of Patent: Oct. 28, 2014

(54) DOCKING ASSISTANCE SYSTEM

(71) Applicant: Caterpillar Inc., Peoria, IL (US)

(72) Inventors: Hong Liu, Peoria, IL (US); Brian G. Funke, Peoria, IL (US); Mathew Chacko, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 52 days.

(21) Appl. No.: 13/787,132

(22) Filed: Mar. 6, 2013

(65) Prior Publication Data

US 2014/0257626 A1 Sep. 11, 2014

(51) Int. Cl.
  *G06F 19/00* (2011.01)
  *G06F 11/32* (2006.01)
  *E02F 9/20* (2006.01)

(52) U.S. Cl.
  CPC ............ *G06F 11/324* (2013.01); *E02F 9/2054* (2013.01); *G05D 2201/021* (2013.01)
  USPC ............. 701/50; 701/300; 701/408; 701/455; 340/995.1

(58) Field of Classification Search
  None
  See application file for complete search history.

(56) References Cited

U.S. PATENT DOCUMENTS

| | | | |
|---|---|---|---|
| 6,114,993 A | 9/2000 | Henderson et al. | |
| 6,134,493 A | 10/2000 | Kaneko | |
| 6,226,573 B1 | 5/2001 | Okawa et al. | |
| 6,484,078 B1 * | 11/2002 | Kageyama | 701/25 |
| 2010/0198466 A1 | 8/2010 | Eklund et al. | |
| 2012/0136524 A1 * | 5/2012 | Everett et al. | 701/24 |

FOREIGN PATENT DOCUMENTS

WO 2011090093 7/2011

* cited by examiner

*Primary Examiner* — Michael J Zanelli

(57) ABSTRACT

A system for assisting in docking of a machine at a loading location is provided. The system includes a first controller and a second controller. The first controller is configured to generate a signal indicative of one or more loading locations associated with a loading machine. The second controller is communicably coupled to the first controller, a position detection module, a sensor and a display unit. Based on the signals received from the first controller, the position detection module and the sensor, the second controller compares the received signals and selects an exact loading location of the one or more loading locations. The second controller then determines when the current position of the machine crosses a predefined threshold distance and displays, on the display unit, a zoomed-in top view of the machine on the worksite and the exact loading location, based on the determination.

20 Claims, 7 Drawing Sheets

DOCKING ASSISTANCE SYSTEM

TECHNICAL FIELD

The present disclosure relates to a docking assistance system, more specifically for providing assistance to an operator for docking a machine on a worksite.

BACKGROUND

During loading operation of material from a loading machine onto a transportation machine like a truck, the truck needs to be docked in an appropriate loading position to ensure proper loading of the material. Usually, the loading machine operator may indicate to the truck operator the loading position at which the truck needs to reach by holding an implement of the loading machine over the loading location. The truck operator then visually judges how to maneuver the machine to reach the loading location positioned approximately below the implement of the loading machine. In this process, sometimes the truck operators are not consistently able to position their truck on the desired loading location. This may lead to a long truck spotting time and loading machine waiting time, resulting in an overall low loading efficiency.

U.S. Pat. No. 6,114,993 discloses a method for determining and displaying a correlated position of a truck as it is being loaded by an earth moving machine having a bucket. The method receives a loading signal event signal. The method then determines the correlated position of the truck in response to the loading event signal. The correlated position includes an orientation of the truck. The method further displays the correlated position of the truck relative to the land site.

SUMMARY OF THE DISCLOSURE

In one aspect of the present disclosure, a system for assisting in docking of a machine at a loading location is provided. The system includes a first controller and a second controller. The first controller is configured to generate a signal indicative of one or more loading locations associated with a loading machine. The second controller is communicably coupled to the first controller, a position detection module, a sensor and a display unit. Based on signals received from the first controller, the position detection module and the sensor, the second controller compares the received signals and selects an exact loading location of the one or more loading locations. The second controller then determines when the current position of the machine crosses a predefined threshold distance and displays, on the display unit, a zoomed-in top view of the machine on a worksite and the exact loading location, based on the determination.

In another aspect of the present disclosure, a method for assisting in docking of a machine at a loading location present on a worksite is provided. The method receives, from a position detection module, a signal indicative of a current position of the machine. The method then receives, from a sensor, a signal indicative of an operational parameter associated with the machine. The method then receives, from a controller, a signal indicative of one or more loading locations associated with a loading machine. The method then compares the signal indicative of the one or more loading locations associated with the loading machine with the signal indicative of the operational parameter associated with the machine. The method selects an exact loading location of the one or more loading locations based on the comparison. Further, the method determines when the current position of the machine crosses a predefined threshold distance. The method further displays a zoomed-in top view of the machine on the worksite and the exact loading location, based on the determination.

Other features and aspects of this disclosure will be apparent from the following description and the accompanying drawings.

DETAILED DESCRIPTION

Figure 1:
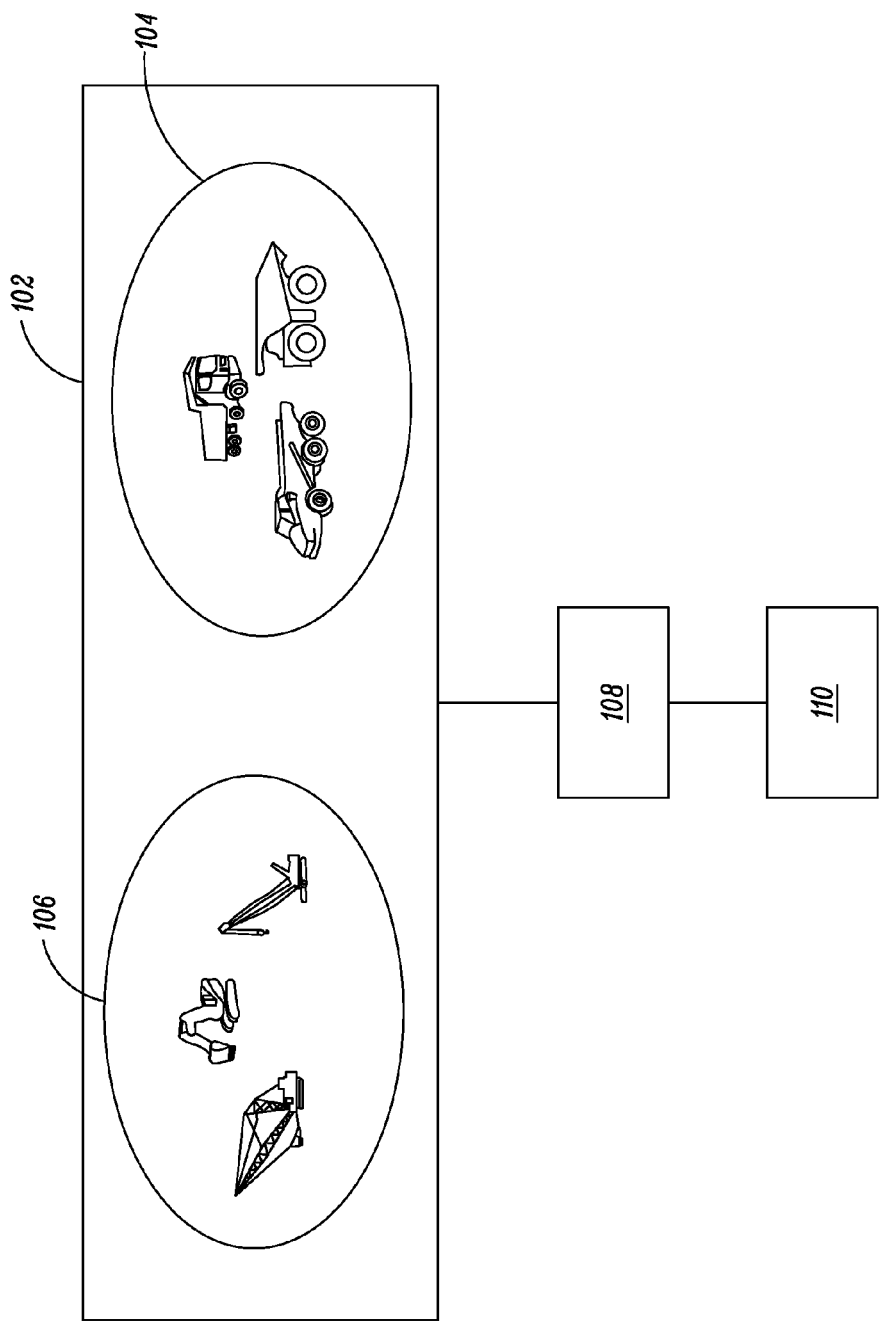
FIG. 1 is an exemplary worksite, according to one embodiment of the present disclosure.

Wherever possible, the same reference numbers will be used throughout the drawings to refer to the same or the like parts. FIG. 1 shows an exemplary worksite 102. A number of different machines 104 configured for transportation of material from one location to another may be deployed on the worksite 102. The machine 104 may be for example, a mining truck, a haul truck, an on-highway truck, an off-highway truck, an articulated truck, and the like. Further, a number of different loading machines 106 may also be deployed on the worksite 102. The loading machine 106 is configured to load the material on the machine 104. The type of loading machines 106 may include, for example, a conveyor, a large wheel loader, a track-type loader, a shovel, a dragline, a crane or any other loading machine known to one skilled in the art.

In one embodiment, the machine 104 and the loading machine 106 may be communicably coupled to each other via a communication system 108. In another embodiment, the machine 104 and the loading machine 106 may be communicably coupled to a remote control station 110. Typically, the remote control station 110 is located off-work site. The remote control station may enable remote monitoring and/or controlling of various functions related to operation of the loading machine 106 and/or the machine 104 deployed on the worksite 102.

The communication system 108 may be, but not limited to, a wide area network (WAN), a local area network (LAN), an Ethernet, Internet, an Intranet, a cellular network, a satellite network, or any other suitable network for transmitting data between the machine 104, the loading machine 106 and/or the remote control station 110. In various embodiments, the communication system 108 may include a combination of two or more of the aforementioned networks and/or other types of networks known in the art. The communication system 108 may be implemented as a wired network, a wireless network or a combination thereof. Further, data transmission between the machine 104, the loading machine 106 and/or the remote control station 110 may occur over the communication system 108, in an encrypted or otherwise secure format, in any of a wide variety of known manners.

Figure 2:
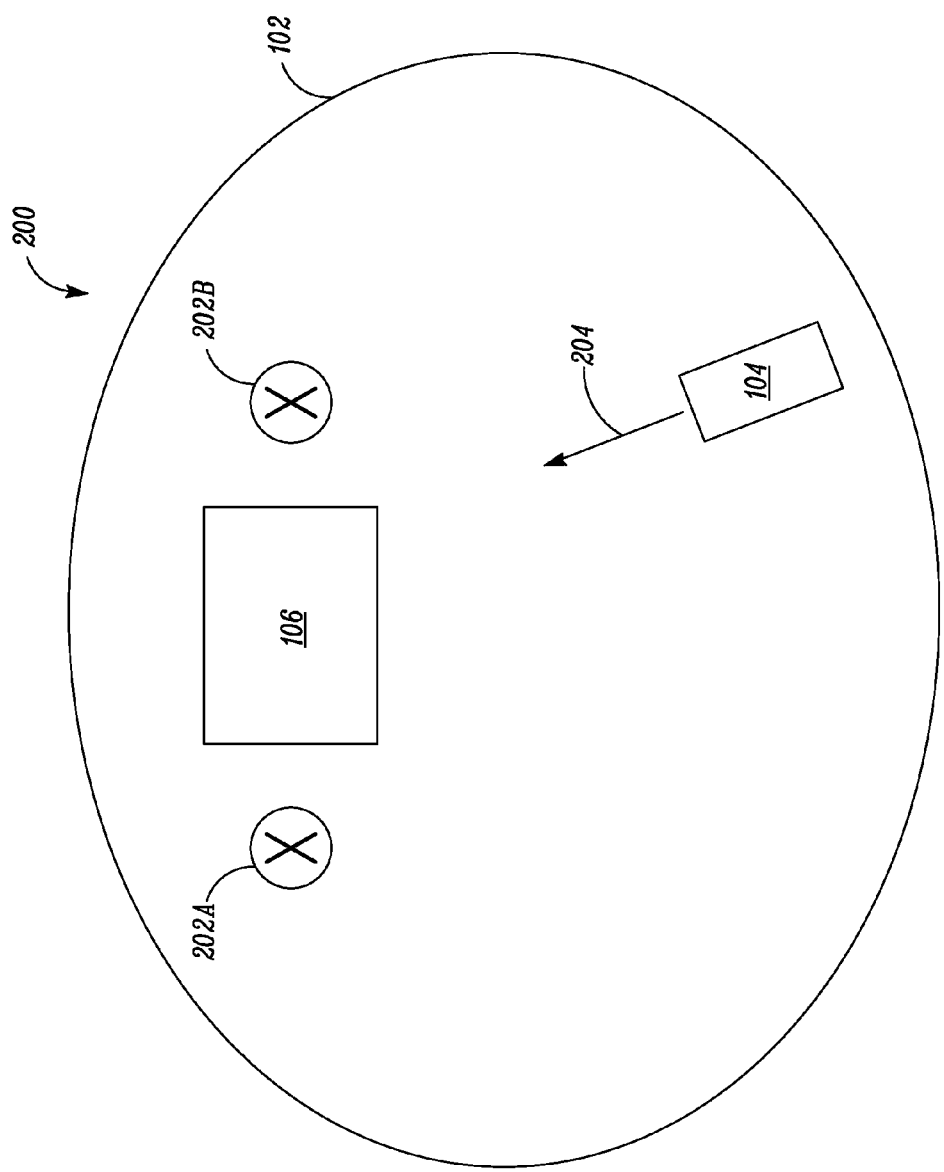
FIG. 2 is a diagrammatic view of a loading machine and corresponding loading locations.

FIG. 2 illustrates an overhead view 200 of a portion of the worksite 102 having the loading machine 106 and the machine 104. The loading machine 106 is capable of movement on the worksite 102. Once the loading machine 106 is parked or docked at a given location on the worksite 102, one or more loading locations may be associated with the loading machine 106. In the exemplary situation shown in FIG. 2, two loading locations 202A, 202B are provided on either side of the loading machine. It should be noted that this is merely an exemplary scenario. The loading locations 202A, 202B are indicative of the position at which the machine 104 needs to be maneuvered in order for the loading machine 106 to load the material onto the machine 104.

Typically, the loading locations 202A, 202B may be provided proximate to the loading machine 106 based on possible positions of a linkage assembly of the loading machine 106. More specifically, since the linkage assembly is capable of movement in an arcuate manner with different lengths of extension of a lift arm, the loading locations 202A, 202B may be positioned at different distances on either side of the loading machine 106. As shown in the accompanying figure one or more loading locations 202A, 202B may be associated with the loading machine 106, such that each of the loading locations 202A, 202B may be equidistant from the loading machine 106 or may be located at varying distances from the loading machine 106. The arrowhead 204 in FIG. 2 indicates a direction of movement of the machine 104 on the worksite 102.

Figure 3:
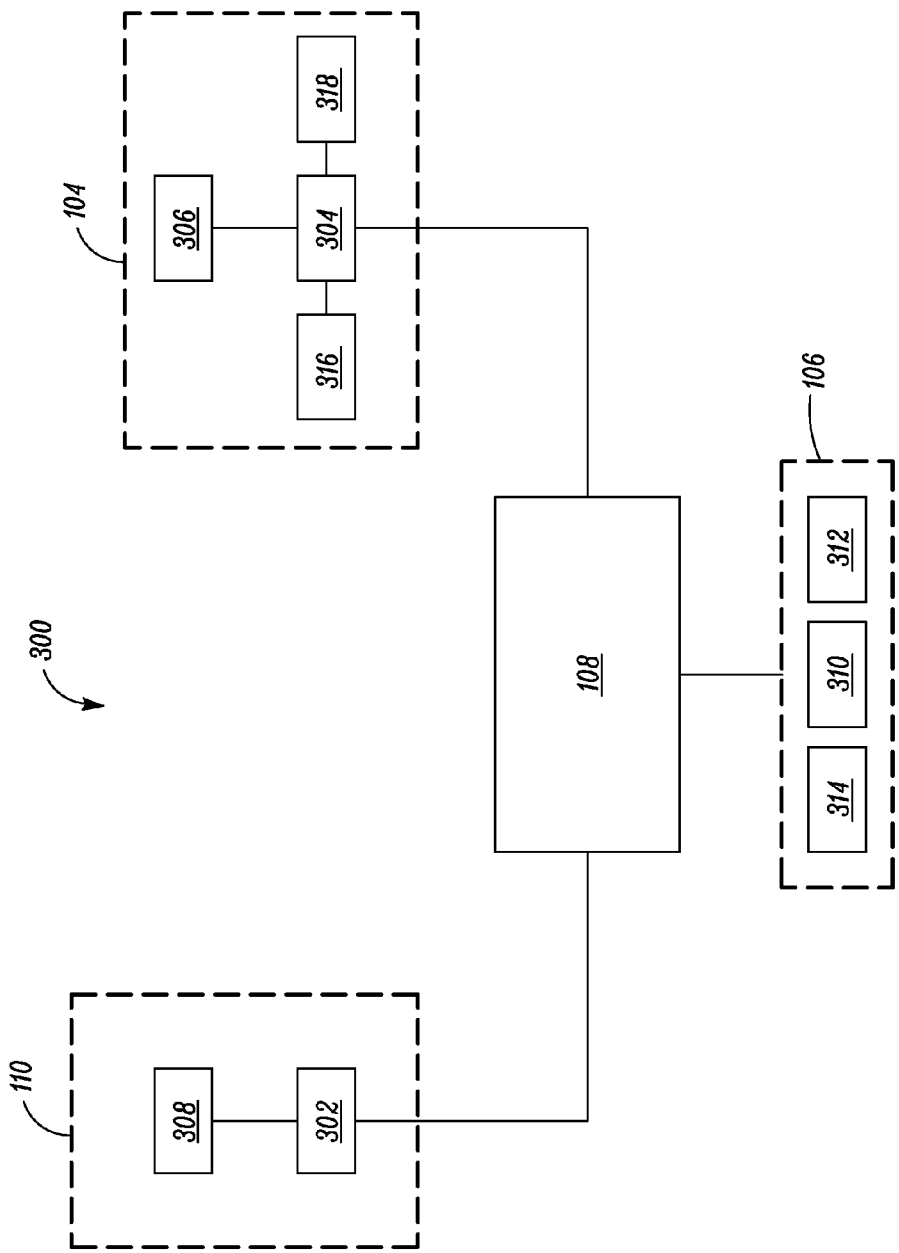
FIG. 3 is a block diagram of an exemplary configuration of a docking assistance system.
Figure 4:
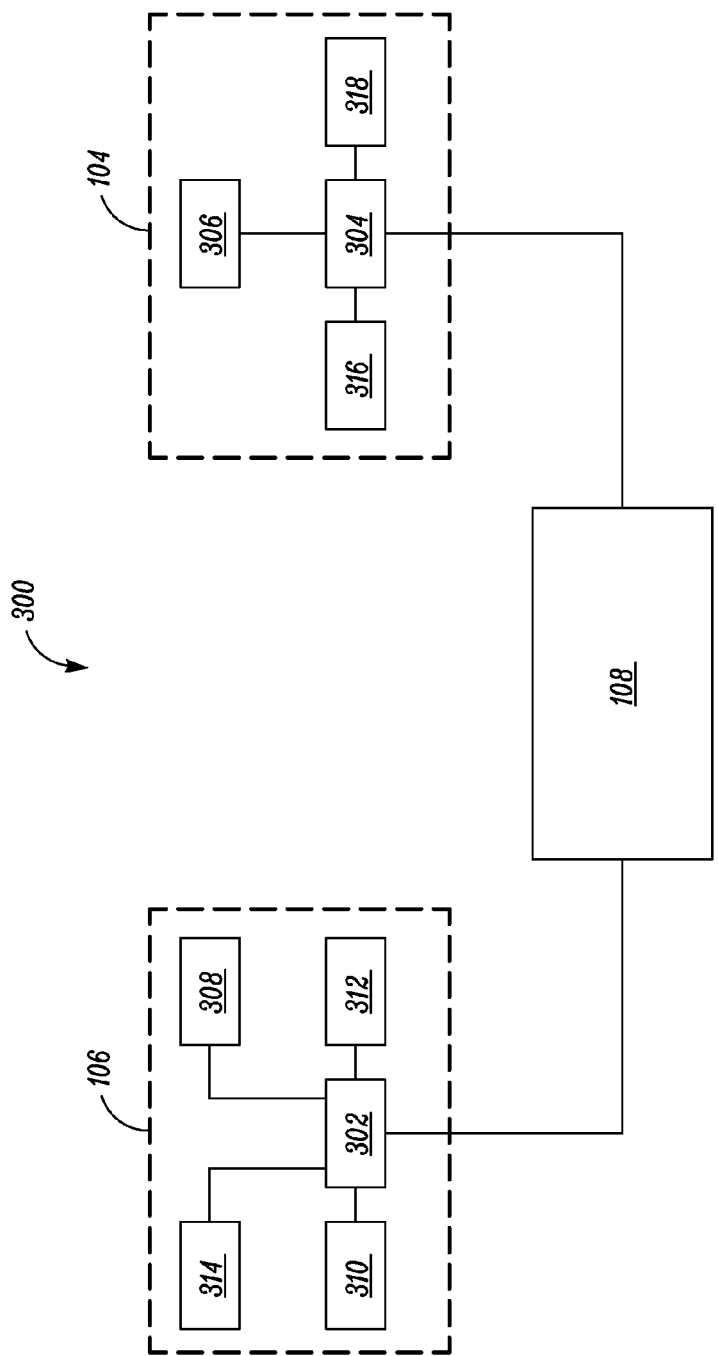
FIG. 4 is a block diagram of another exemplary configuration of the docking assistance system.

The present disclosure relates to a docking assistance system 300 (shown in FIG. 3) which is configured to assist in the docking of the machine 104 in the loading locations 202A, 202B. More specifically the docking assistance system 300 includes a first controller 302 located remotely from the machine 104. The first controller 302 is configured to generate a signal indicative of the one or more loading locations 202A, 202B associated with the loading machine 106. Further, the docking assistance system 300 includes a second controller 304 located on-board the machine 104. The second controller 304 is communicably coupled to the first controller 302 and is configured to select an exact loading location of the one or more loading locations 202A, 202B based on a current speed, steering angle, and heading of the machine 104 on the worksite 102. Further, a display unit 306 present on-board the machine 104 is configured to display the exact loading location and a current position of the machine 104, based on control signals received from the second controller 304, in order to assist in the docking of the machine 104. The different components of the docking assistance system 300 may be deployed across the machine 104, the loading machine 106 and/or the remote control station 110. FIGS. 3 and 4 illustrate distinct exemplary configurations of deploying the docking assistance system 300, according to various embodiments of the present disclosure.

Referring to FIG. 3, the machine 104, the loading machine 106 and the remote control station 110 may be communicably coupled to each other via the communication system 108. As shown in the block diagram, the remote control station 110 may include the first controller 302. The first controller 302 may be configured to send and receive control signals to and from the machine 104 and/or the loading machine 106 via the communication system 108.

In one embodiment, an operator input device 308 may be communicably coupled to the first controller 302. The operator input device 308 may be a touchscreen device employing onscreen buttons and/or a type of an alphanumerical keyboard configured to receive input in the form of touch gestures. Alternatively, the operator input device 308 may include a control panel including buttons, switches, keypads, and like to receive an input from an operator present in the remote control station 110.

The loading machine 106 may include a position determination unit 310 configured to generate a signal indicative of a position of the loading machine 106 on the worksite 102. The position determination unit 310 may be any one or a combination of a Global Positioning System, a Global Navigation Satellite System, a Pseudolite/Pseudo-Satellite, any other Satellite Navigation System, an Inertial Navigation System or any other known position detection system known in the art.

The loading machine 106 may also include an implement sensor 312 located on the linkage assembly of the loading machine 106. The implement sensor 312 may be any one or a combination of an accelerometer, an inclinometer, pressure sensors etc. attached to the linkage assembly. The implement sensor 312 is configured to generate a signal indicative of a position of the linkage assembly relative to a frame of the loading machine 106. Alternatively, the position of the linkage assembly may be determined based on an operator input command or through any other known methods. Further, a display device 314 may be present within an operator cabin of the loading machine 106. The display device 314 may be an LCD device, an LED device, a CRT monitor, a touchscreen device or any other display device known in the art.

The first controller 302 present at the remote control station 110 may receive the signal indicative of the position of the loading machine 106 from the position determination unit 310 via the communication system 108. In one embodiment, the first controller 302 may also receive the signal indicative of the position of the linkage assembly from the implement sensor 312. In one embodiment, based on these received signals, the first controller 302 may be configured to generate the signal indicative of the one or more loading locations 202A, 202B associated with the loading machine 106 on the worksite 102. Alternatively, in another embodiment, based on the received signals, the operator present in the remote control station 110 may manually feed in the one or more loading locations 202A, 202B associated with the loading machine 106 via the operator input device 308. In yet another embodiment, an on-board controller (not shown in figure) on the loading machine 106 may send the signal indicative of the one or more loading locations 202A, 202B associated with the loading machine 106, to the first controller 302. Thereafter, the first controller 302 may send the signal indicative of the one or more loading locations 202A, 202B to the second controller 304 on-board the machine 104 via the communication system 108.

FIG. 4 illustrates a block diagram of an alternative implementation of the docking assistance system 300. In this exemplary configuration, the first controller 302 may be present on-board the loading machine 106. The first controller 302 may be communicably coupled to the position determination unit 310, the implement sensor 312 and the display device 314. As described earlier, the first controller 302 may receive the signal indicative of the position of the loading machine 106 and/or the position of the linkage assembly of the loading machine 106.

Thereafter, the first controller 302 may generate the signal indicative of the one or more loading locations 202A, 202B associated with the loading machine 106. In one example, the operator of the loading machine 106 may control the movement of the linkage assembly such that a bucket of the loading machine 106 is positioned above the loading locations 202A, 202B. Accordingly, the first controller 302 may determine the one or more loading locations 202A, 202B based on the position of the linkage assembly. In an alternative configuration, the operator of the loading machine 106 may manually feed the one or more loading locations 202A, 202B into the first controller 302 via the operator input device 308 on-board the loading machine 106.

A person of ordinary skill in the art will appreciate that in the implementation shown in FIG. 4, the loading machine 106 and the machine 104 may directly communicate with each other via the communication system 108, independent of the remote control station 110. As can be seen in FIGS. 3 and 4, the first controller 302 is communicably coupled to the second controller 304 on-board the machine 104 via the communication system 108. The first controller 302 is configured to send the signal indicative of the one or more loading locations 202A, 202B to the second controller 304.

Referring to FIGS. 3 and 4, the machine 104 may include a position detection module 316, at least one sensor 318, a display unit 306 and the second controller 304. The position detection module 316 is configured to generate a signal indicative of a current position of the machine 104 on the worksite 102. The position detection module 316 may be any one or a combination of a Global Positioning System, a Global Navigation Satellite System, a Pseudolite/Pseudo-Satellite, any other Satellite Navigation System, an Inertial Navigation System or any other known position detection module known in the art.

The at least one sensor 318 present on-board the machine 104 may be configured to generate a signal indicative of one or more operational parameters associated with the machine 104. The one or more operational parameters of the machine 104 may include, for example, at least one of the speed, the heading, the steering angle, the transmission gear of the machine 104, and the like. Accordingly, the at least one sensor 318 may include a speed sensor, a steering angle sensor like an accelerometer, a magnetometer, a compass, a gyroscope, etc. a transmission gear sensor, or any combination thereof. The machine 104 may further include the display unit 306, preferably located in an operator cabin of the machine 104. The display unit 306 may be an LCD device, an LED device, a CRT monitor, a touchscreen device or any other display unit known in the art.

The position detection module 316, the at least one sensor 318 and the display unit 306 may be communicably coupled to the second controller 304 present on-board the machine 104. The second controller 304 may be configured to receive the signal indicative of the one or more loading locations 202A, 202B from the first controller 302. Further, the second controller 304 may receive the signal indicative of the one or more operational parameters associated with the machine 104 from the at least one sensor 318. Additionally, the second controller 304 may receive the signal indicative of the current position of the machine 104 on the worksite 102 from the position detection module 316.

The second controller 304 may be configured to compare the signal indicative of the one or more loading locations 202A, 202B associated with the loading machine 106 with the signal indicative of the one or more operational parameters associated with the machine 104. Based on the comparison, the second controller 304 is configured to select an exact loading location of the one or more loading locations 202A, 202B. It should be noted that the exact loading location may be an ideal position to dock the machine 104 based on the current machine characteristics such as the speed, the heading, the transmission gear, the steering angle, and the like. One of ordinary skill in the art will appreciate that selection of the exact loading location by the second controller 304 on-board the machine 104 is based on a predictive system that determines which of the loading locations 202A, 202B the machine 104 is approaching depending on parameters such as, the machine speed, the heading, the transmission gear, the steering angle, and the like.

In another embodiment, a single or the exact location may be communicated to the second controller 304 on-board the machine 104. The term exact location herein refers to a desired loading location 202A, 202B which is preselected for the machine 104 from an off-board source, like the loading machine 106 and/or the remote control station 110. One of ordinary skill in the art will appreciate that in this case, the predictive system that determines which loading location 202A, 202B the machine 104 is approaching may not be required.

It should be noted that the allocation of the loading locations 202A, 202B to the machine 104 may be done in a variety of ways. As described earlier, in connection with FIG. 3, the loading locations 202A, 202B may be determined by the on-board controller on the loading machine 106 and subsequently communicated from the loading machine 106 to the remote control station 110, and thereafter communicated to the machine 104.

In one exemplary situation, the remote control station 110 may communicate the loading location 202A, 202B to the second controller 304 on the machine 104. The selection of the exact loading location may be determined by the second controller 304 on-board the machine 104. Alternatively, the first controller 302 present at the remote control station 110 may determine the exact loading location for the machine 104 and may communicate this location to the second controller 304 on-board the machine 104.

Additionally, in another exemplary situation, as described in connection with FIG. 4, the loading locations 202A, 202B may be determined by the first controller 302 on-board the loading machine 106 and communicated to the machine 104, independent of the remote control station 110. In one embodiment, the first controller 302 on-board the loading machine 106 may communicate the exact loading location to the machine 104.

Further, a predefined threshold distance may be defined for the docking assistance system 300. In one embodiment, the predefined threshold distance may include a predetermined distance between the loading locations 202A, 202B and the current position of the machine 104. In another embodiment, the predefined threshold distance may be a predetermined distance between the position of the loading machine 106 and the current position machine 104. In yet another embodiment, the predefined threshold distance may be a predetermined distance between the current position of the machine 104 and a fixed set boundary on the worksite 102. This boundary may define a virtual work area on the worksite 102. It should be noted that any one or a combination of the above mentioned factors may be utilized by the docking assistance system 300. Data related to the predefined threshold distance may be stored in a database (not shown) communicably coupled to the second controller 304.

The second controller 304 may be configured to monitor the current position of the machine 104. Further, the second controller 304 may retrieve the data related to the predefined threshold distance from the database. The second controller 304 may then determine when the current position of the machine 104 crosses the predefined threshold distance. When such an event happens, the second controller 304 may be configured to display a zoomed-in top view of the machine 104 on the worksite 102 and the exact loading location on the display unit 306 provided on the machine 104. For example, when the current position of the machine 104 crosses the predefined threshold distance of 30 m from the selected loading location 202B, the zoomed-in top view is displayed to the operator on-board the machine 104. In one example, the display unit 306 on-board the machine 104 may display the top view of the machine 104 on the worksite 102. Further, on receiving the control signal indicative of when the machine 104 crosses the predefined threshold distance from the second controller 304, the display on the display unit 306 may switch or change to that of the zoomed-in top view.

Figure 5:
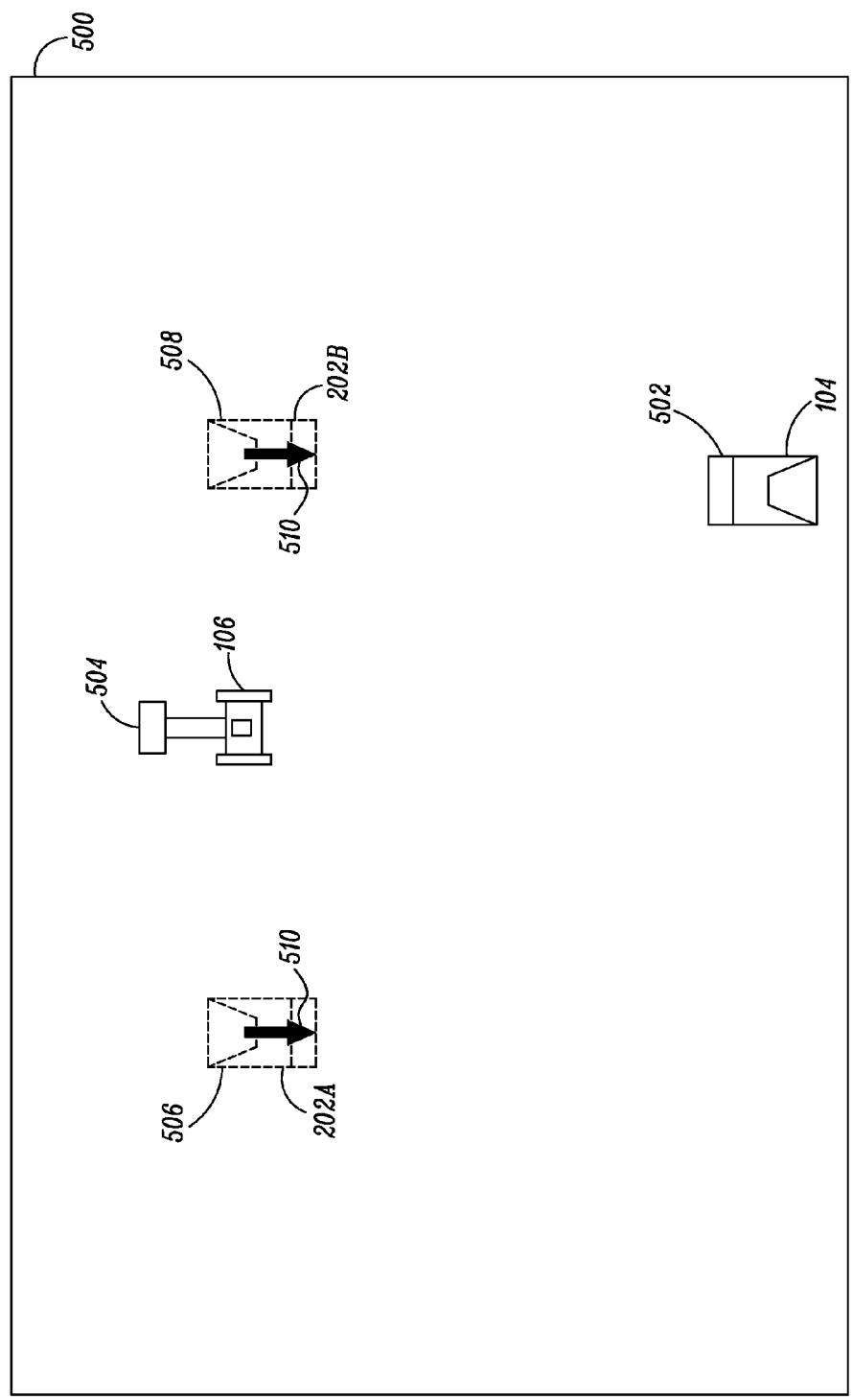
FIGS. 5 and 6 are exemplary displays of the docking assistance system.
Figure 6:
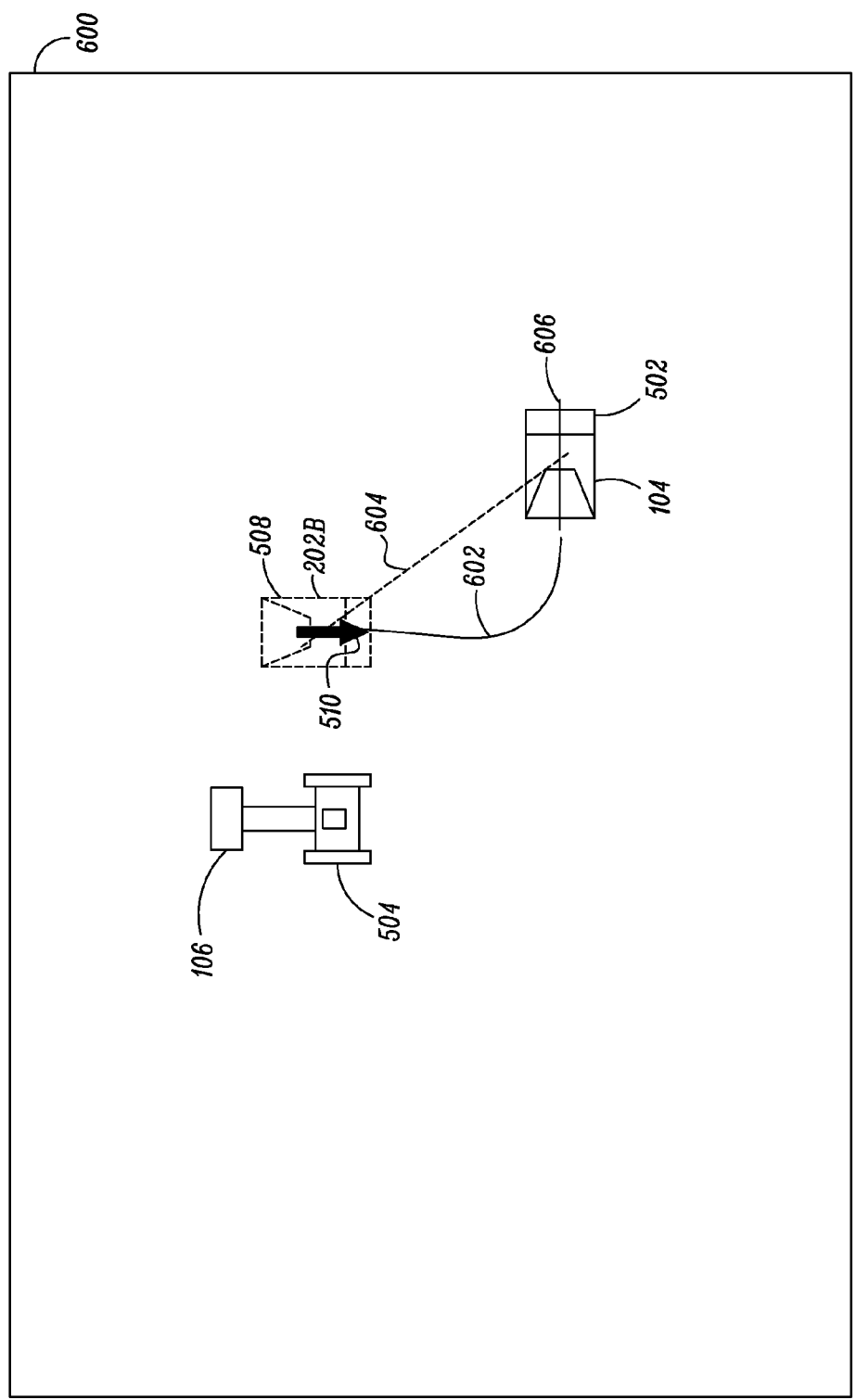

FIGS. 5 and 6 are exemplary displays 500, 600 showing the top view and the zoomed-in top view respectively. As shown in the accompanying figures, the displays 500, 600 may include simulated views of the worksite 102. The top view and the zoomed-in top view of the worksite 102 may be simulated with the use of an appropriate algorithm or associated software known in the art. More specifically, as seen in FIG. 5, the display 500 may include a first icon 502 representing the current position of the machine 104 on the worksite 102 and a second icon 504 representing the position of the loading machine 106 on the worksite 102. Further, the one or more loading locations 202A, 202B may also be represented by appropriate loading location icons 506, 508 on the display 500. Additionally, an arrowhead 510 may be provided on the loading location icons 506, 508 to indicate an orientation of the machine 104 which is required at the loading locations 202A, 202B.

FIG. 6 is the display 600 showing the zoomed-in top view of the display 500 shown in FIG. 5. As described earlier, the zoomed-in top view may be displayed on the display unit 306 when the current position of the machine 104 crosses the predefined threshold distance. For example, when the machine 104 is 20 m away from the loading location 202B, the display on the display unit 306 may change from the display 500 to the display 600. The zoomed-in top view may show an enlarged view of the current position of the machine 104 and the exact loading location 202B using the respective icons 502, 508. As shown on FIG. 6, a dashed or broken line 604 may be provided connecting the loading location icon 508 and the first icon 502 which may be an indication of approaching the loading location 202B. The dashed line 604 may be indicative of the shortest route between the current position of the machine 104 and the loading location 202B. Additionally, a continuous line 606 may be provided along the longitudinal axis of the first icon 502. The line 606 may be indicative of a current orientation of the machine 104. In one embodiment, the position of the loading machine 106 may also be shown on the display 600.

In one embodiment, as the machine 104 moves towards the loading location 202B, the display 600 may show different levels of zoom-in based on a relative distance between the current position of the machine 104 and the loading location 202B. For example, when the machine 104 is at the distance of 15 m from the loading location 202B, the display 600 shows a 25 percent level of zoom-in. Whereas, when the machine 104 is at the distance of 10 m from the loading location 202B, the display 600 shows a 50 percent level of zoom-in. The level of zoom-in may be selected automatically by the docking assistance system 300 based on the relative distance between the current position of the machine 104 and the loading location 202B.

Alternatively, the operator on-board the machine 104 may manually select the zoom-in level. The levels of zoom-in provided by the docking assistance system 300 may be prefixed based on the application. Further, in one embodiment, additional information to assist in the docking of the machine 104 at the loading location 202B may be provided. This additional information may include indicators of a distance remaining to be covered, a change in steering angle required for alignment, a suggestive route 602, etc. for assisting the operator to maneuver the machine 104 to the loading location 202B on the worksite 102. Also, icons 502, 504, 506, 508 of different color or design schemes may be used to suggest further information to the operator. For example, when the loading location icon 508 is red, it may be an indication to the operator that the loading machine 106 is currently idle since the operator of the loading machine 106 may have stepped out.

Additionally, when the machine 104 is appropriately docked in the loading location 202B, the second controller 304 may be configured to generate a signal indicative of the docking of the machine 104 in the loading location 202B. The first controller 302 may receive the signal indicative of the docking of the machine 104 in the loading location 202B from the second controller 304 via the communication system 108. Accordingly, the first controller 302 may be configured to keep track of an occupation status of the loading locations 202A, 202B associated with the loading machine 106. In one embodiment, the first controller 302 may send a control signal to the display device 314 on-board the loading machine 106 to notify the operator of the loading machine 106 of the docking of the machine 104 in the given loading location 202B.

The first and/or the second controllers 302, 304 may embody a single microprocessor or multiple microprocessors that includes a means for receiving signals from the components of the docking assistance system 300. Numerous commercially available microprocessors may be configured to perform the functions of the first and/or the second controllers 302, 304. It should be appreciated that the first and/or the second controllers 302, 304 may readily embody a general machine microprocessor capable of controlling numerous machine functions. A person of ordinary skill in the art will appreciate that the first and/or the second controllers 302, 304 may additionally include other components and may also perform other functionality not described herein. It should be understood that the embodiments and the configurations and connections explained herein are merely on an exemplary basis and may not limit the scope and spirit of the disclosure.

INDUSTRIAL APPLICABILITY

Loading operation of the material from a loader onto a transportation machine like a truck requires the truck to be docked in an appropriate loading position to ensure proper loading of the material. Usually, the loader operator assists the truck operator in the docking of the truck by holding an implement of the loader approximately above the loading position. The truck operator then visually judges and maneuvers the truck to the loading position. This process may be inaccurate and time consuming.

Figure 7:
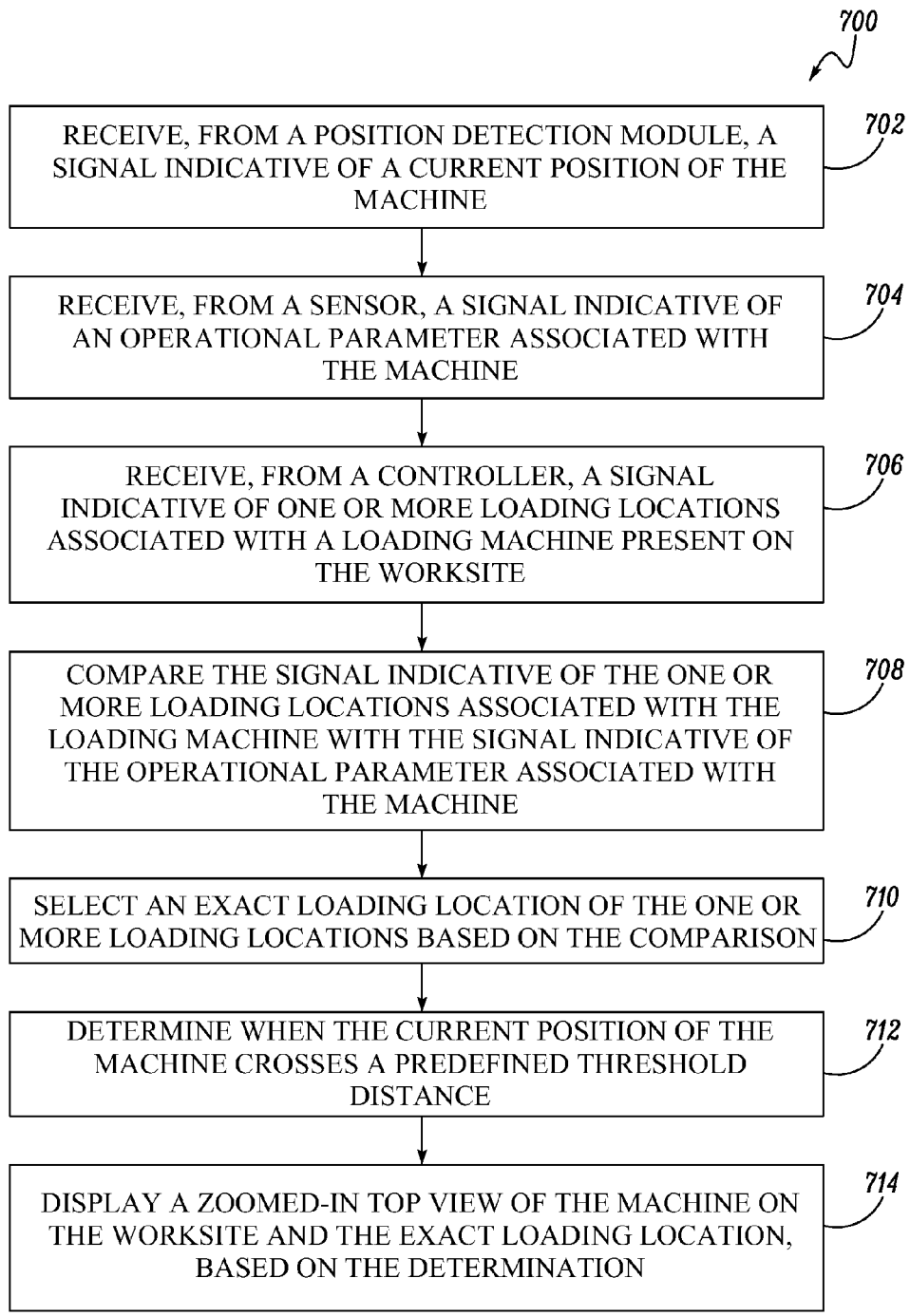
FIG. 7 is a method of operation of the docking assistance system.

The present disclosure relates to the docking assistance system 300 which may provide an improved method for assisting in docking of the machine 104, leading to a reduction in machine 104 spotting duration and increased efficiency of the material loading process. FIG. 7 depicts a method of operation of the docking assistance system 300. At step 702, the second controller 304 on-board the machine 104 may receive the signal indicative of the current position of the machine 104 from the position detection module 316. At step 704, the second controller 304 may receive the signal indicative of the one or more operational parameters associated with the machine 104 from the sensors 318.

At step 706, the second controller 304 may receive the signal indicative of the one or more loading locations 202A, 202B associated with the loading machine 106 from the first controller 302. As described earlier, the first controller 302 is present off-board the machine 104. The first controller 302 may be deployed in the remote control station 110 or on the loading machine 106. Further, in one embodiment, first controller 302 may generate the signal indicative of the one or more loading locations 202A, 202B based on the position of the loading machine 106 and/or the position of the linkage assembly of the loading machine 106.

In another embodiment, the first controller 302 may generate the signal indicative of the one or more loading locations 202A, 202B based on the input received from operator input device 308 present either in the remote operator station 110 or the loading machine 106. Alternatively, in yet another embodiment, an on-board controller on the loading machine 106 may send the signal indicative of the one or more loading locations 202A, 202B associated with the loading machine 106, to the first controller 302 present at the remote control station 110. At step 708, the second controller 304 may compare the signal indicative of the one or more loading locations 202A, 202B associated with the loading machine 106 with the signal indicative of the operational parameter associated with the machine 104. At step 710, based on the comparison, the second controller 304 may select the exact loading location of the one or more loading locations 202A, 202B. The selected loading location may be a preferred location for the docking of the machine 104.

Further, at step 712, the second controller 304 may determine when the current position of the machine 104 crosses the predefined threshold distance. The predefined threshold distance may be based on the relative distance between the current position of the machine 104 and at least one of the position of the loading machine 106, the loading locations 202A, 202B and the fixed boundary on the worksite 102. Thereafter, at step 714, when the current position of the machine 104 crosses the predefined threshold distance, the second controller 304 may display the zoomed-in top view on the display unit 306 on-board the machine 104. In one embodiment, the second controller 304 may generate the signal indicative of the docking of the machine 104 in the loading location 202B. This signal may be received by the first controller 302. The first controller 302 may be configured to display the notification of the docking of the machine 104 in the loading location 202B on the display device 314 present on the loading machine 106.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for assisting in docking of a machine at a loading location present on a worksite, the system comprising:
   a position detection module located on-board the machine, the position detection module configured to generate a signal indicative of a current position of the machine;
   a sensor located on-board the machine, the sensor configured to generate a signal indicative of an operational parameter associated with the machine;
   a display unit located on-board the machine;
   a first controller located remotely from the machine, the first controller configured to generate a signal indicative of one or more loading locations associated with a loading machine;
   and
   a second controller located on-board the machine, the second controller communicably coupled to the position detection module, the sensor, the display unit and the first controller, the second controller configured to:
   receive the signal indicative of the current position of the machine;
   receive the signal indicative of the operational parameter associated with the machine;
   receive, from the first controller, the signal indicative of the one or more loading locations associated with the loading machine;
   compare the signal indicative of the one or more loading locations associated with the loading machine with the signal indicative of the operational parameter associated with the machine;
   select an exact loading location of the one or more loading locations based on the comparison;
   determine when the current position of the machine crosses a predefined threshold distance; and
   display, on the display unit, a zoomed-in top view of the machine on the worksite and the exact loading location, based on the determination.

2. The system of claim 1, wherein the second controller is further configured to generate a signal indicative of the docking of the machine in the loading location.

3. The system of claim 2, wherein the first controller is configured to receive the signal indicative of the docking of the machine in the loading location.

4. The system of claim 3 further including a display device located on the loading machine and communicably coupled to the first controller, the display device configured to notify an operator of the docking of the machine in the loading location.

5. The system of claim 1, wherein the first controller is located on the loading machine.

6. The system of claim 1 further including an operator input device communicably coupled to the first controller, the operator input device configured to receive an input from an operator indicative of the one or more loading locations.

7. The system of claim 1 further including a position determination unit present on the loading machine, the position determination unit configured to generate a signal indicative of at least one of a position of the loading machine and a position of a linkage assembly associated with the loading machine.

8. The system of claim 7, wherein the first controller is communicably coupled to the position determination unit and is configured to generate the signal indicative of the one or more loading locations based on at least one of the position of the loading machine and the position of a linkage assembly associated with the loading machine.

9. The system of claim 1, wherein the predefined threshold distance includes a predetermined distance between the selected exact loading location and the current position of the machine.

10. The system of claim 1, wherein the predefined distance includes a predetermined distance between the position of the loading machine and the current position of the machine.

11. The system of claim 1, wherein the predefined distance includes a predetermined distance between the current position of the machine and a set boundary defined on the worksite.

12. The system of claim 1, wherein the operational parameter associated with the machine includes at least one of a speed, a heading, a steering angle, a transmission gear of the machine.

13. The system of claim 1, wherein the display unit is configured to display a top view of the worksite prior to the zoom-in.

14. The system of claim 1, wherein the display unit is configured to display simulated views.

15. The system of claim 1, wherein the second controller is further configured to provide a plurality of zoom in levels of the top view of the machine on the worksite and the exact loading location.

16. The system of claim 1 wherein the second controller is configured to receive a signal indicative of the exact loading location.

17. A method for assisting in docking of a machine at a loading location present on a worksite, the method comprising:
- receiving, from a position detection module, a signal indicative of a current position of the machine;
- receiving, from a sensor, a signal indicative of an operational parameter associated with the machine;
- receiving, from a controller, a signal indicative of one or more loading locations associated with a loading machine present on the worksite;
- comparing the signal indicative of the one or more loading locations associated with the loading machine with the signal indicative of the operational parameter associated with the machine;
- selecting an exact loading location of the one or more loading locations based on the comparison;
- determining when the current position of the machine crosses a predefined threshold distance; and
- displaying a zoomed-in top view of the machine on the worksite and the exact loading location, based on the determination.

18. The method of claim 17 further including generating a signal indicative of the docking of the machine in the loading location.

19. The method of claim 17, wherein the operational parameter associated with the machine includes at least one of a speed, a heading, a steering angle, a transmission gear of the machine.

20. A machine operating on a worksite, the machine comprising:
- a position detection module configured to generate a signal indicative of a current position of the machine;
- a sensor configured to generate a signal indicative of an operational parameter associated with the machine;
- a display unit; and
- a controller communicably coupled to the position detection module, the sensor, and the display unit, the controller configured to:
  - receive the signal indicative of the current position of the machine;
  - receive the signal indicative of the operational parameter associated with the machine;
  - receive a signal indicative of one or more loading locations present on the worksite;
  - compare the signal indicative of the one or more loading locations with the signal indicative of the operational parameter associated with the machine;
  - select an exact loading location of the one or more loading locations based on the comparison;
  - determine when the current position of the machine crosses a predefined threshold distance; and
  - display a zoomed-in top view of the machine on the worksite and the exact loading location, based on the determination.

* * * * *